United States Patent
Reuter

(10) Patent No.: US 8,381,765 B2
(45) Date of Patent: Feb. 26, 2013

(54) VALVE

(75) Inventor: Martin Reuter, Dachau (DE)

(73) Assignee: Marco Systemanalyse und Entwicklung GmbH, Dachau (DE)

( * ) Notice: Subject to any disclaimer, the term of this patent is extended or adjusted under 35 U.S.C. 154(b) by 1113 days.

(21) Appl. No.: 12/111,613

(22) Filed: Apr. 29, 2008

(65) Prior Publication Data

US 2008/0264496 A1    Oct. 30, 2008

(30) Foreign Application Priority Data

Apr. 30, 2007  (DE) .......................... 10 2007 020 361

(51) Int. Cl.
*F16K 37/00* (2006.01)
*F16K 1/16* (2006.01)
*F16K 31/02* (2006.01)

(52) U.S. Cl. .................. 137/552; 137/554; 251/129.06; 251/300; 251/368

(58) Field of Classification Search .......... 137/551, 137/553, 554, 552; 251/129.01, 129.06, 251/298, 299, 300, 301, 349, 368
See application file for complete search history.

(56) References Cited

U.S. PATENT DOCUMENTS

| | | | | |
|---|---|---|---|---|
| 1,359 A | * | 10/1839 | Whittemore | |
| 129,263 A | * | 7/1872 | Zwietusch | 251/300 |
| 562,892 A | * | 6/1896 | Gates et al. | 251/300 |
| 1,589,107 A | * | 6/1926 | Campbell, Jr. | 251/300 |
| 2,497,508 A | * | 2/1950 | Michell | 251/300 |
| 2,636,518 A | * | 4/1953 | Strebel | 251/300 |
| 2,991,794 A | * | 7/1961 | Harrower | 251/301 |
| 3,023,774 A | * | 3/1962 | Schuller | 137/553 |
| 4,392,509 A | * | 7/1983 | Siddall | 251/300 |
| 5,280,808 A | * | 1/1994 | Kvinge et al. | 251/301 |
| 5,345,963 A | | 9/1994 | Dietiker | |
| 5,950,988 A | * | 9/1999 | Nardick | 251/303 |
| 6,305,662 B1 | * | 10/2001 | Parsons et al. | 251/129.04 |
| 6,752,373 B1 | * | 6/2004 | Rudy et al. | 251/300 |
| 6,959,911 B2 | | 11/2005 | Strasser et al. | |

FOREIGN PATENT DOCUMENTS

| | | |
|---|---|---|
| DE | 697 09 529 T2 | 5/2002 |
| DE | 100 62 704 A1 | 7/2002 |
| DE | 102 33 601 A1 | 2/2004 |
| EP | 1 411 285 A1 | 4/2004 |
| EP | 1 467 133 A1 | 10/2004 |
| JP | 61103081 A | 5/1986 |

OTHER PUBLICATIONS

European Search report dated Feb. 1, 2011 in corresponding European Patent Application No. 08007130.1, 3 pages.
English translation of European Search report dated Feb. 1, 2011 in corresponding European Patent Application No. 08007130.1, 3 pages.
German Search Report, German Patent Application No. 10 2007 020 361.8, dated Jun. 26, 2007.
Translation of German Search Report, Geman Patent Application No. 10 2007 020 361.8, dated Jun. 26, 2007.

* cited by examiner

*Primary Examiner* — John Rivell
(74) *Attorney, Agent, or Firm* — Lewis and Roca LLP

(57) ABSTRACT

The present invention relates to a valve. The valve includes a valve element having a metering opening, a valve gate which is movable in translation for the opening and closing of the metering opening, an actuating actuator configured for the execution of a tilting movement, and a lever arm which is coupled to the actuating actuator and which converts the tilting movement of the actuating actuator for the opening and closing of the metering opening into a translatory stroke movement of the valve gate.

19 Claims, 4 Drawing Sheets

VALVE

CROSS-REFERENCE TO RELATED APPLICATIONS

This application claims priority to co-pending German Application Serial Number 10 2007 020 361.8, file Apr. 30, 2007, which hereby is incorporated by reference as if set forth herein.

BACKGROUND OF THE INVENTION

Field of the Invention

The present invention relates to a valve and in particular to a valve for the metering of pasty media in the small volume range and the very small volume range in the area of automated production and production engineering.

The increasing miniaturization of industrial products is a trend which is becoming stronger and stronger above all in the field of entertainment electronics and communications electronics. The manufacture of components which are becoming smaller and smaller leads to completely new challenges from a technological engineering aspect, particularly at high production frequencies. This applies above all to the metering of pasty media during the production process. However, there is not only a need to meter pasty media such as adhesives, fats, oils, fluxes or lacquers very accurately in the small volume range and very small volume range in electronics, but also in the areas of mechanical engineering and apparatus engineering, precision engineering, medical engineering, chemistry, food technology and packaging technology.

In addition to the increasing miniaturization, shorter and shorter cycle times in the area of production engineering require a very reliable process security and accuracy of the metering.

It is the underlying object of the present invention to provide a valve which satisfies the highest demands on the accuracy of the metering and which can be operated precisely at high metering frequencies.

BRIEF DESCRIPTION OF THE INVENTION

This object is satisfied by a valve which has the features of the present invention. The valve in accordance with the invention has a valve element which includes a metering opening through which the medium to be metered can be supplied to a metering needle. To prevent a continuous inflow of the medium to be metered to the metering needle through the metering opening for the purposes of metering, the valve furthermore has a valve gate which is movable in translation and with which the metering opening of the valve element can be opened and closed as required. The valve gate and the valve element are in friction locking contact with one another so that the valve element and/or the valve gate can be made of a ceramic material to increase the abrasion resistance and wear resistance of these components.

To generate the desired alternating opening and closing movement of the valve gate, the valve furthermore has an actuator which preferably comprises a piezo drive. Since, however, only comparatively small strokes can be produced directly with such a piezo drive which are not sufficient to cause the valve gate to make the desired translatory stroke movement with a required stroke of approximately 1 mm, the actuating actuator is configured for the execution of a tilting movement, with a lever arm being coupled to said actuation actor and converting, and thus amplifying, the tilting movement of the actuator to open and close the metering opening of the valve element into the desired stroke movement of the valve gate.

In other words, the tilting movement of the actuator is converted into a pendulum movement, with its maximum deflection increasing as the lever arm length increases so that the valve gate can be caused to make the desired translatory stroke movement to open and close the metering opening of the valve element by the oscillating deflection movement of the free end of the lever arm.

The conversion of the tilting movement of the actuator by a lever arm coupled thereto furthermore proves to be advantageous in that the rotary character of the tilting movement can be transformed, in particular with a very long lever arm length, into an approximately translatory stroke movement of the valve gate. It is thus only subjected to very small rotary movement components.

Advantageous embodiments of the invention are set forth in the description, in the drawings and in the dependent claims.

To be able to transfer the tilting movement of the actuating actuator to the valve gate as accurately and predictably as possible, the lever arm can have a hollow cross-section closed in itself. A large moment of inertia of an area (of the second order) of the lever arm can be achieved with only a low dead weight thereof by this measure so that it has a comparatively high rigidity with a low dead weight. The minimization of the dead weight of the lever arm is in particular of interest to keep the mass inertia forces of the lever arm small since it would otherwise no longer be able to follow the stimulation frequency due to the very high stimulation frequencies by the actuator which can amount to 500 Hz and more. The maximization of the moment of inertia of an area (of the second order) is of interest, in contrast, so that the lever arm does not bend over its length in order thus to be able to exactly predict and/or calculate the deflection thereof at its free end.

Since the lever arm is only exposed to small bending strains at its free end, the cross-section of the lever arm can converge continuously in the direction of the valve gate since, due to the lower bending strain at the free end, only smaller moments of inertia of an area are required there. Furthermore, the named cross-section convergence also proves to be advantageous with respect to the desired minimization of the mass inertia moment, whereby the response behavior of the lever arm to the excitation by the actuator can be further improved.

To further improve the rigidity properties as well as the inertia behavior of the lever arm, it can be made of a sheet of stainless steel which can in particular have a thickness t of approximately 0.1 mm. The manufacture of the lever arm from stainless steel, however, in particular proves to be advantageous due to the comparatively high Young's modulus of stainless steel, which has a directly positive effect on the deformation behavior of the lever arm.

To ensure a manufacture of the lever arm which is as simple as possible, it can be joined, in particular welded together, from a plurality of folded shaped sheet metal parts. A closed hollow cross-section can be produced with simple means in this manner in that, for example, two (a plurality of) sheet metal parts folded in the longitudinal direction are welded together along their free rims. For reasons of completeness, it must be mentioned at this point that also shaped sheet metal parts with a round cross-sectional geometry fall under the term "folded shaped sheet metal part" within the framework of the present invention since a rounding does not represent anything else than a folding with a comparatively large bending radius.

In accordance with an embodiment, the actuator can include a yoke in the form of a tilting base to which the lever arm is connected, in particular welded, in rigid manner as a cantilever which is coupled at its freely projecting end to the valve gate. In this connection, the tilting movement of the piezo drive is transferred into a tilting movement of the lever arm and is converted into the desired translatory stroke movement.

Since the tilting movement of the actuator or of its tilting base converted by the lever arm also still includes slight rotary movement components with a comparatively long lever arm length and a small deflection, the lever arm can include a coupling element for the reception of the valve gate at its freely projecting end. This coupling element can have a comparatively low rigidity in the direction of the longitudinal extent of the lever arm in order thus to be able to compensate movement components of the lever arm aligned perpendicular to the translatory stroke movement of the valve gate so that they are not transferred to the valve gate, whereby unwanted constrictions can be further reduced.

In accordance with a further embodiment of the present invention, the valve in accordance with the invention furthermore includes a supply line such as a tube or a hose via which the medium to be metered can be supplied to the metering opening. To keep the number of interfaces at which the medium to be metered can escape in an unwanted manner as small as possible in the region of the valve, the downstream end of the supply line is movable in translation in this connection, with the valve gate being arranged in continuation of the downstream end of the supply line and having a flow opening through which the medium to be metered can be supplied from the supply line to the metering opening of the valve element. Since the valve gate is caused to make an alternating translatory stroke movement in the manner described above by the actuating actuator or by the lever arm caused to make a pendulum movement by the actuating actuator, the coupling of the valve gate to the downstream end of the supply line has the result that the downstream end of the supply line is also moved to and fro in translation by the stroke movement of the valve gate. There is thus only an interface between the valve gate and the valve element in the form of the movement join along which the valve gate slides along the valve element, whereby the number of any interfaces through which the medium to be metered can escape from the valve in an unwanted manner is reduced.

In this embodiment, in which the valve gate is arranged in continuation of the downstream end of the supply line, a desired quantity of medium flowing in the supply line is output to the metering opening every time that the flow opening formed in the valve gate passes the metering opening formed in the valve element due to the stroke movement of the valve gate, whereby the desired metering is achieved.

Since a yawning joint can occur between the valve gate and the downstream end of the supply line as a result of the deflection of the downstream end of the supply line caused by the stroke movement of the valve gate, in particular when the supply lie is made as a tubular line, the downstream end of the supply line can be elastically connected to the valve gate and can in particular be sealed with respect to it via an elastic O ring. In this manner, a movement compensation is provided between the valve gate and the downstream end of the supply line, whereby unwanted leaks can be prevented.

In a corresponding manner, the upstream end of the supply line can also be connected to a fixed media passage, whereby likewise any leaks can be avoided.

To be able to monitor the proper function of the valve, the valve can furthermore include a path measuring device, for example, with which the stroke movement of the lever arm can be monitored, with it being able to be sufficient to monitor the stroke movement purely qualitatively, for example using a light barrier. To be able to evaluate the stroke movement quantitatively, however, an inductively working path measuring device can, for example, also be provided which is configured to allow a conclusion on the speed of the lever arm during its stroke movement.

The proper function of the valve can also be monitored in that the oscillating behavior of the medium to be metered is monitored since a pressure surge acts on the medium on every opening and closing of the valve, whereby the medium is excited to make oscillations.

To be able to draw a conclusion on any malfunction of the valve, for example as a result of wear on the valve element and/or on the valve gate) or to monitor the filling level of the medium to be metered, a sensor for structure-borne sound can furthermore be provided with which e.g. the medium filling or the wear of the valve can be monitored.

BRIEF DESCRIPTION OF THE DRAWING FIGURES

The invention will be described in the following with reference to an exemplary embodiment and to the enclosed drawings, wherein.

DETAILED DESCRIPTION OF THE INVENTION

Figure 1:
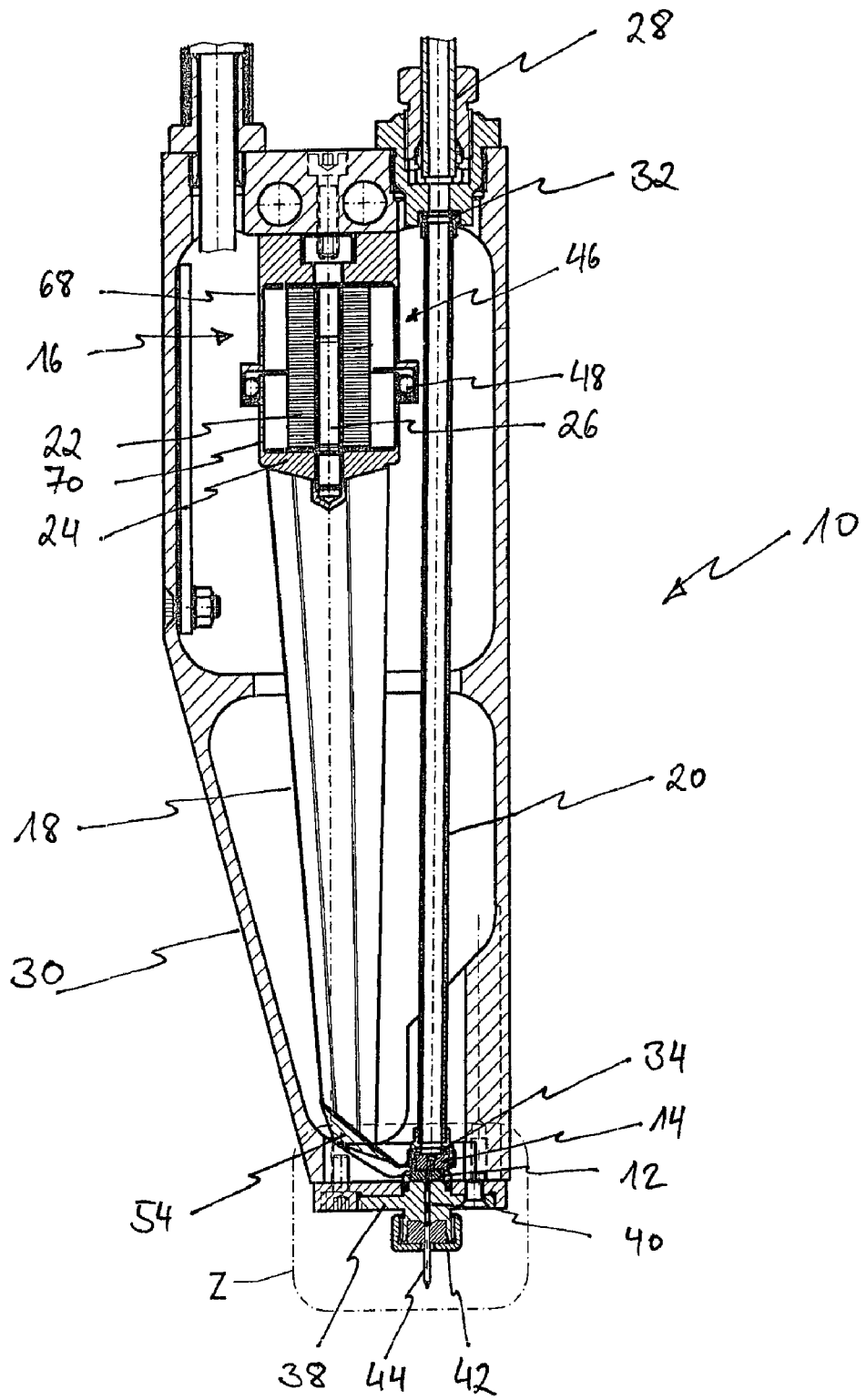
FIG. 1 shows a sectional representation of the valve in accordance with the invention from the side.

In the following, the basic structure of the valve in accordance with the invention will be described with reference to FIGS. 1 to 3, said valve being marked as a whole by the reference numeral 10 in FIGS. 1 and 2 and being accommodated in a housing 30. A media passage 28 via which the medium to be metered is supplied to the valve 10 opens into the housing 30. The media passage 28 continues in the interior of the housing 30 in the form of a supply line 20 which is sealed at the media passage 28 via an elastic O ring 32. The supply line 20 can be either a tube or a hose.

Figure 3:
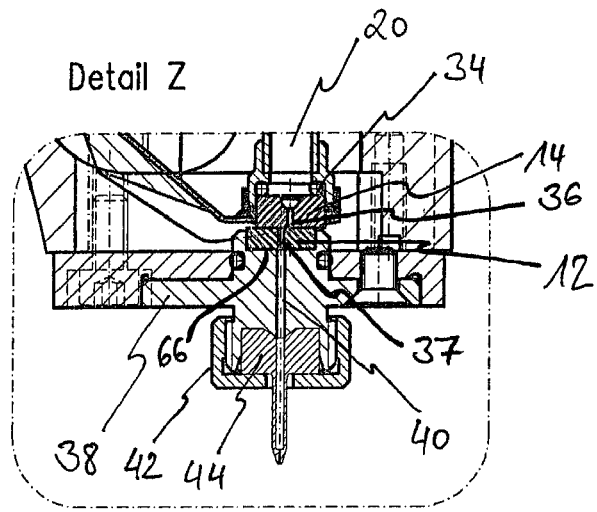
FIG. 3 shows the detail Z of FIG. 1 in an enlarged representation.

As can best be seen from FIG. 3, in continuation of the downstream end of the supply line 20, a valve gate 14 is coupled to the supply line 20 and is likewise sealed with respect to it by an O ring 34. However, in order not to impede the flow of the medium through the supply line 20, the valve gate 14 has a flow opening 36 through which the medium can be dispensed to the metering opening 37 of a valve element 12 which is fitted into a receiver 66 of an adjustment plate 38 which is in turn fastened to the housing 30 at the lower side. The metering opening 37 of the valve element 12 continues into a metering passage 40 which extends through the adjustment plate 38 and which in turn on its part continues in the passage opening of a metering needle 44 which is fastened by means of a retainer nut 42 to a fastening stub of the adjustment plate 38.

The medium supplied to the valve 10 via the media passage 28 thus flows through the supply line 20 to the valve gate 14 or through its flow opening 36 to be supplied through the metering opening 37 of the valve element 12 and through the metering passage 40 in the adjustment plate 38 to the metering needle 44 to be able to be dispensed by it in a metered manner.

To prevent a continuous flow on the just described flow path of the medium to be metered for the purposes of the metering, the valve gate 14 is in friction locking contact with the valve element 12 and can in particular be displaced in translation transversely to the metering opening 37 so that only when the flow opening 36 coincides with the metering opening 37 of the valve element 12, that is the valve is open, is a flow of the medium and thus the dispensing of the medium to be metered from the metering needle 44 possible. If, however, the valve gate 14 is moved to the side, as is shown in FIGS. 1 and 3, and if the flow opening 36 does not coincide with the metering opening 37 of the valve element 12, that is the valve is closed, a flow of the medium to be metered is suppressed.

To be able to dispense the medium to be metered in the small volume range and very small volume range via the metering needle 44, it is accordingly necessary to cause the valve gate 14 to make a radio frequency translatory stroke movement transversely to the metering opening 37 so that the metering opening 37 is always only opened briefly when the flow opening 36 of the valve gate 14 coincides with the metering opening 37.

To cause the valve gate 14 to make this radio frequency, translatory stroke movement, the valve 10 furthermore includes an actuator 16 which, in the embodiment shown here, has two tilting elements 22 in the form of piezoactuators such as are described in detail in DE 196 46 511 C1 or in DE 198 55 221 A1, with reference being explicitly made hereto. The tilting elements 22 in the form of piezoactuators are fitted into a protective housing 46 of the actuator 16 which is fastened to the upper side of the housing 30 of the valve 10. The protective housing 46 consists of an upper housing half 68 and a lower housing half 70 which are sealed with respect to one another by means of an elastic O ring seal 48 so that the actuator 16 is hermetically sealed to prevent an unwanted penetration of a medium. In this connection, a yoke which is called a tilting base 24 and which is braced with the upper housing half 66 via a clamping screw 26 forms the end of the lower housing half 70. Due to an alternating power supply of the two tilting elements 22, they stretch and contract unilaterally and alternately, which has the result that the tilting base 24 is caused to make a tilting movement around an axis which is perpendicular to the drawing plane of the representation of FIG. 1.

To be able to convert this tilting movement of the tilting base 24 to the valve gate 14 and in particular in a reinforced manner, a lever arm 18 is welded to the tilting base 24 and is coupled at its free end to the valve gate 14. The tilt oscillation of the tilting base 24 is thus converted via the lever arm 18 into a translatory stroke movement of the valve gate 14 to be able to open and close the metering opening 37 alternately in the desired manner.

The tilting elements 22 in the form of piezoactuators can admittedly be excited without difficulty to an oscillation at a frequency from 500 Hz to 1 kHz. However, to be able to transfer this frequency precisely to the valve gate 14, the lever arm 18 has a special cross-section which will be looked at in the following.

Figure 2:
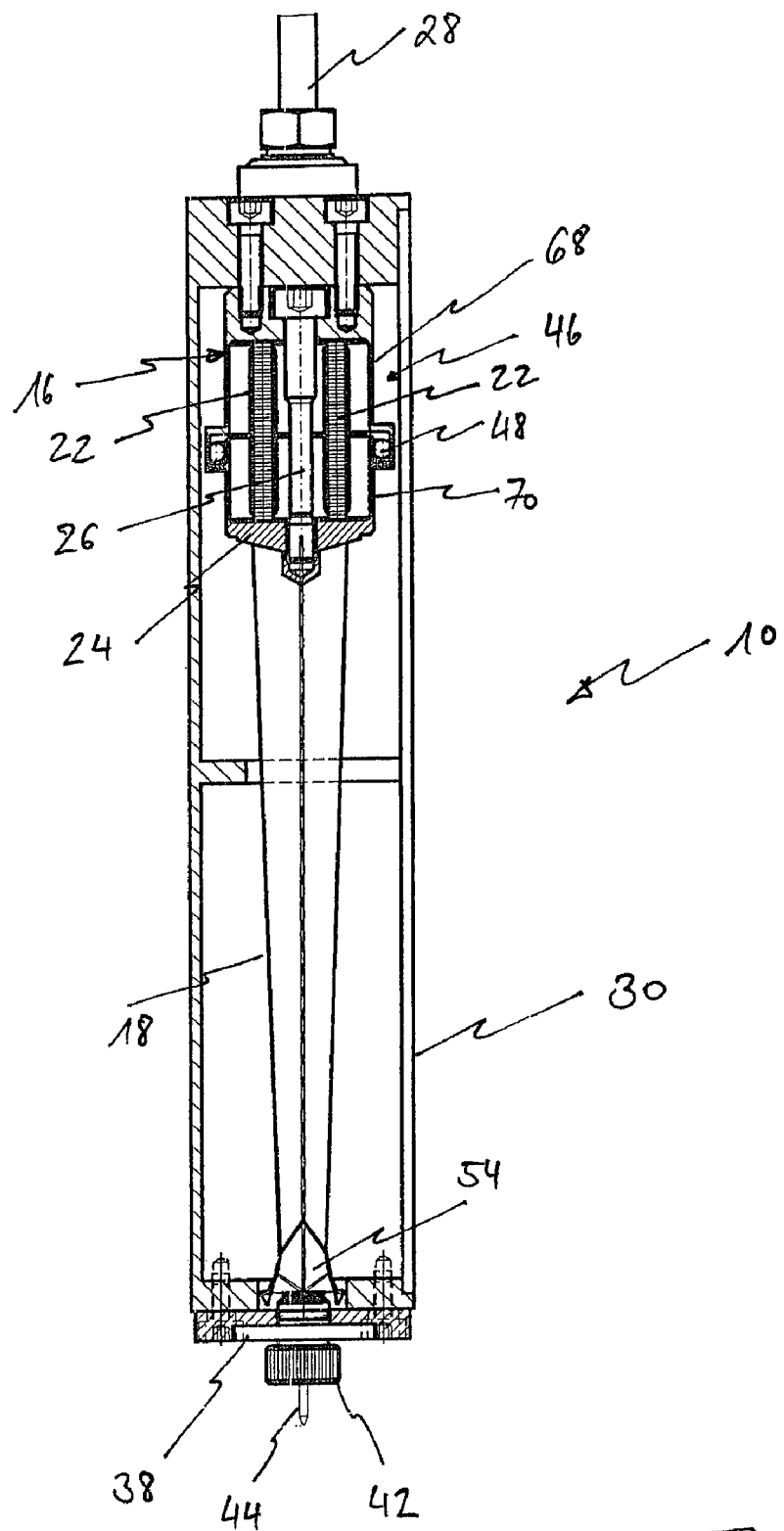
FIG. 2 shows a sectional representation of the valve in accordance with the invention from the front.
Figure 6:
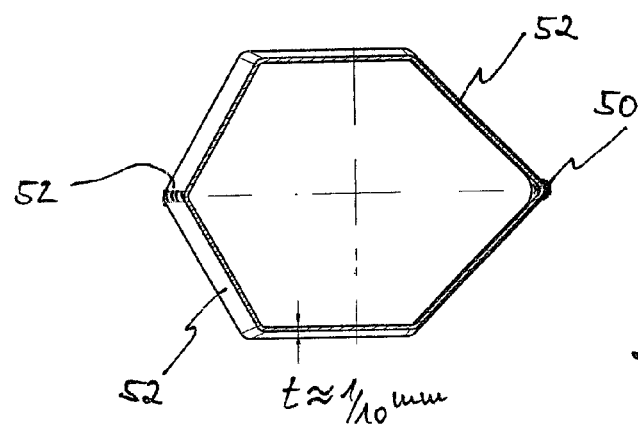
FIG. 6 shows a cross-sectional representation of the lever arm in a bottom view.

As can already be seen without difficulty from the representations of FIGS. 1 and 2, the lever arm 18 has a design which converges in the direction of the valve gate 14, which proves to be advantageous with respect to the mass inertia forces occurring on the acceleration of the lever arm. As FIG. 6 furthermore shows, the lever arm 18 has a honeycombed hollow cross-section which is closed in itself in the embodiment shown, which likewise proves advantageous, on the one hand, with respect to the reduction of the mass inertia forces. On the other hand, however, such a hollow cross-section has an approximately equivalent moment of inertia of an area with respect to a corresponding full cross-section so that this reduction of the weight of the lever arm 18 only insignificantly effects a reduction of the rigidity of the lever arm 18.

With a corresponding material selection (for example stainless steel), the wall thickness of the lever arm 18 can be reduced down to approximately 0.1 mm without this compromising the rigidity in an inappropriate manner. To simplify the manufacture of such a lever arm 18 with a closed hollow cross-section converging in the longitudinal direction, the lever arm 18 can be joined, in particular welded together, from a plurality of folded shaped sheet metal parts 52 as can be seen from the representation of FIG. 6. To manufacture the lever arm 18 shown, first two symmetrical shaped sheet metal parts 52 are folded over from a sheet of stainless steel and are subsequently connected to one another by corresponding weld seams 50 along their free rims.

As has already been described, the tilting movement of the tilting base 24 can be transformed with the help of the lever arm 18 into a substantially translatory stroke movement of the free end of the lever arm 18 or of the valve gate 14 coupled thereto. Since, however, the free end of the lever arm 18 also has an albeit also very small-movement component perpendicular to the desired translatory stroke movement of the valve gate 14 on its pendulum movement, it is desirable to decouple the valve gate 14 from the lever arm 18 such that this perpendicular movement component is not transferred to the valve gate 14.

Figure 7:
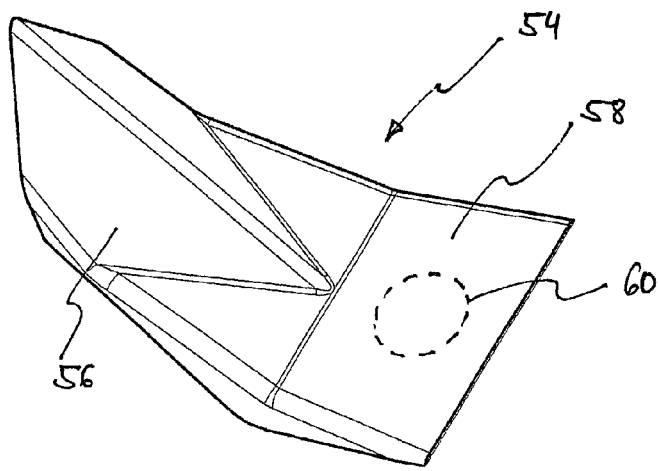
FIG. 7 shows a three-dimensional representation of the coupling element.

For this purpose a coupling element 54 which is folded from a sheet of stainless steel, as can be seen in detail from FIG. 7, is welded to the free end of the lever arm 18. As can be seen from this representation, the coupling element 54 has a folding mechanism section 56 and a planar support section 58 adjoining it. In this connection, the folding mechanism section 56 gives the coupling element 54 the required rigidity in the longitudinal direction to be able to transfer the movement component aligned perpendicular to the longitudinal extent of the lever arm 18 to the valve gate 14. The folding mechanism section in this connection is welded to the free end of the lever arm 18 at an angle of approximately 45° and projects laterally slightly beyond the lever arm 18. In contrast to this, the planar support section 58 which is aligned substantially perpendicular to the longitudinal axis of the lever arm 18 is comparatively soft and thus able to compensate the movement component aligned parallel to the longitudinal extend of the lever arm 18 on a deflection of the lever arm 18 so that it is not transferred to the valve gate 14.

Figure 4:
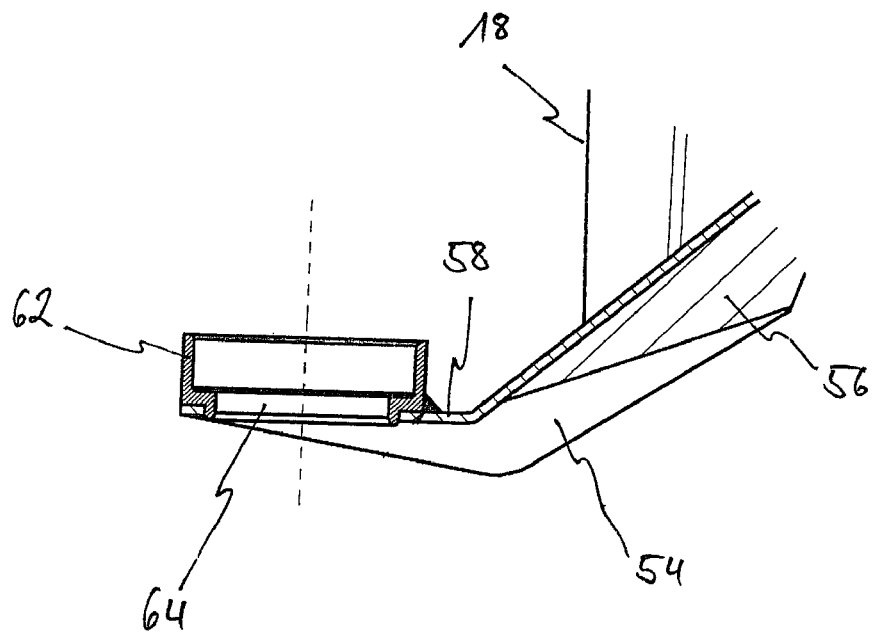
FIG. 4 shows a lateral sectional representation in the region of the coupling element of the lever arm.
Figure 5:
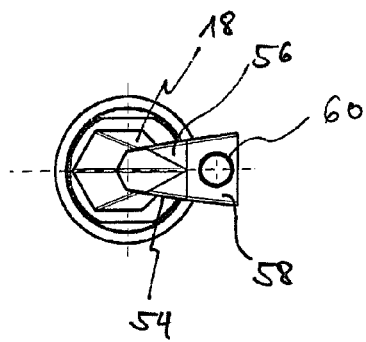
FIG. 5 shows a bottom view of the lever arm.

The support section 58 has a bore 60 (see FIGS. 5 and 7) into which a receiving element 62 is fitted (FIG. 4) which is fastened to the support section 58 by means of a weld seam. The receiving element 62 has a receiving opening 66 which is coordinated with the design of the valve gate 14 so that it can extend through the receiving opening 66 and its lower side can thus move into contact with the valve element 12.

The tilting movement of the tilting base 24 brought about with the aid of the tilting elements 22 in the form of piezoactuators can thus be transferred precisely as a result of the filigree, but nevertheless rigid design of the lever arm 18 to the valve gate 14 in the form of a translatory stroke movement, said valve gate sliding to and fro on the valve element 12 as a result of the direct contact therewith, for which purpose both the valve gate 14 and the valve element 12 are made of a ceramic material to increase the abrasion strength and the wear strength. The medium supplied to the valve gate via the supply line 20 in this connection then flows every time into the metering opening 37 of the valve element 12 and from their to the metering needle 44 when the flow opening 36 of the valve gate 14 coincides with the metering opening 37 of the valve element 12. To achieve a metering in the small volume and very small volume range, it is desirable in this connection to cause the valve gate 14 to make a radio frequency translatory stroke movement. In accordance with the invention, this is ensured by the already previously described special design of the lever arm 18 with which radio frequency tilting oscillations of the tilting base 24 can be converted precisely to the valve gate 14 at a frequency of 500 Hz and more in the form of a translatory stroke movement.

For reasons of completeness, it will be mentioned at this point that the actuation mechanism in the form of the driven lever arm 18 in the form of a piezoactuator with the valve gate 14 caused to make a stroke movement but can also be used as a pure jet interruption device of an injected medium. In this case, the valve element 12 is not required. It is rather the case in this application that a spray jet of a medium is periodically interrupted by the valve gate 14 in that the valve gate 14 is pushed into it at regular intervals with the help of the driven lever arm 18 in the form of a piezoactuator for purposes of metering.

The foregoing description of preferred embodiments of the invention is not intended to limit the scope of the invention to these preferred embodiments, but rather to enable any person skilled in the art to make and use the invention.

As any person skilled in the art will recognize from the previous description and from the figures and claims, modifications and changes can be made to the preferred embodiments of the invention without departing from the scope of the invention defined in the following claims.

The invention claimed is:

1. A valve, in particular for the metering of pasty media, comprising:
    a valve element having a metering opening;
    a valve gate movable in translation for the opening and closing of the metering opening;
    an actuator configured for the execution of a tilting movement and having at least one tilting element in the form of a piezoactuator; and
    a lever arm which is coupled to the actuator and which converts the tilting movement of the actuator for the opening and closing of the metering opening into a translatory stroke movement of the valve gate.

2. A valve in accordance with claim 1, characterized in that the lever arm has a hollow cross-section closed in itself.

3. A valve in accordance with claim 1, characterized in that the lever arm has a cross-section converging in the direction of the valve gate.

4. A valve in accordance with claim 1, characterized in that the lever arm is made of a sheet of stainless steel.

5. A valve in accordance with claim 1, characterized in that the lever arm is joined, in particular welded together, from a plurality of folded shaped sheet parts.

6. A valve in accordance with claim 1, characterized in that the actuator includes a tilting base to which the lever arm is rigidly connected, in particular welded, as a cantilever which is coupled at its freely projecting end to the valve gate.

7. A valve in accordance with claim 1, characterized in that the lever arm has a coupling element at its freely projecting end for the reception of the valve gate.

8. A valve in accordance with claim 1, characterized in that the valve element and/or the valve gate is/are made of a ceramic material.

9. A valve in accordance with claim 1, characterized in that a supply line is furthermore provided via which the medium to be metered can be supplied to the metering opening.

10. A valve in accordance with claim 9, characterized in that the downstream end of the supply line is movable in translation.

11. A valve in accordance with claim 9, characterized in that the valve gate is arranged in continuation of the downstream end of the supply line and has a flow opening through which the medium to be metered can be supplied from the supply line to the metering opening.

12. A valve in accordance with claim 9, characterized in that the downstream end of the supply line is elastically connected to the valve and is in particular sealed with respect to it via an elastic O ring.

13. A valve in accordance with claim 9, characterized in that the upstream end of the supply line is elastically connected to a fixed media passage and is in particular sealed with respect to it via an elastic O ring.

14. A valve in accordance with claim 1, characterized in that a path measurement device is provided which monitors the stroke movement of the lever arm.

15. A valve in accordance with claim 1, characterized in that a sensor for structure-borne sound is provided which monitors the oscillatory behavior of the valve.

16. A valve, in particular for the metering of pasty media, comprising:
    a valve element having a metering opening;
    a valve gate movable in translation for the opening and closing of the metering opening;
    an actuator configured for the execution of a tilting movement; and
    a lever arm, having a cross-section converging in the direction of the valve gate, which is coupled to the actuator and which converts the tilting movement of the actuator for the opening and closing of the metering opening into a translatory stroke movement of the valve gate.

17. A valve, in particular for the metering of pasty media, comprising:
    a valve element having a metering opening;
    a valve gate movable in translation for the opening and closing of the metering opening;
    an actuator configured for the execution of a tilting movement; and
    a lever arm, joined, in particular welded together, from a plurality of folded shaped sheet parts, which is coupled to the actuator and which converts the tilting movement of the actuator for the opening and closing of the metering opening into a translatory stroke movement of the valve gate.

18. A valve, in particular for the metering of pasty media, comprising:
    a valve element having a metering opening;
    a valve gate movable in translation for the opening and closing of the metering opening;
    an actuator configured for the execution of a tilting movement;
    a lever arm which is coupled to the actuator and which converts the tilting movement of the actuator for the opening and closing of the metering opening into a translatory stroke movement of the valve gate; and a supply line via which the medium to be metered can be supplied to the metering opening, a downstream end of the supply line being movable in translation.

19. A valve, in particular for the metering of pasty media, comprising:

a valve element having a metering opening;

a valve gate movable in translation for the opening and closing of the metering opening;

an actuator configured for the execution of a tilting movement;

a lever arm which is coupled to the actuator and which converts the tilting movement of the actuator for the opening and closing of the metering opening into a translatory stroke movement of the valve gate; and a supply line via which the medium to be metered can be supplied to the metering opening, a downstream end of the supply line being elastically connected to the valve and is in particular sealed with respect to the valve via an elastic O ring.

* * * * *